United States Patent

Ogawa et al.

[15] 3,658,583
[45] Apr. 25, 1972

[54] METHOD FOR PRODUCING SEMI-CONDUCTING GLAZE COMPOSITIONS FOR ELECTRIC INSULATORS

[72] Inventors: Yutaka Ogawa, Nagoya; Takayuki Ogasawara, Kohnan; Shoji Seike, Nagoya, all of Japan

[73] Assignee: NGK Insulators, Ltd., Nagoya, Japan

[22] Filed: Sept. 8, 1970

[21] Appl. No.: 70,404

[30] Foreign Application Priority Data

Oct. 11, 1969    Japan..................................44/81014

[52] U.S. Cl..............................117/201, 106/46, 65/134, 117/229
[51] Int. Cl. .......................................................H01b 3/10
[58] Field of Search.....................106/46; 65/134; 174/190; 117/201, 229

[56] References Cited

UNITED STATES PATENTS 2,917,394    12/1959    Schurecht................................106/46
3,368,026    2/1968    Vince....................................106/46 X Primary Examiner—William L Jarvis
Attorney—Robert E. Burns and Emmanuel J. Lobato

[57] ABSTRACT

A semi-conducting glaze composition is prepared by calcining a mixture of 85 – 94 mol percent, calculated as $SnO_2$, of tin oxide and 6 – 15 mol percent, calculated as $Sb_2O_5$, of antimony oxide at a temperature of 1,000° – 1,300° C under an oxidizing atmosphere; mixing 25 – 45 percent by weight of the calcined material with 55 – 75 percent by weight of a conventional ceramic glaze composition; melting the resulting mixture at a temperature of 1,200° – 1,400° C under an oxidizing atmosphere and pulverizing the melt to prepare a fritted material; and mixing again not less than 70 percent by weight of the resulting fritted material with not more than 30 percent by weight of at least one member selected from the group consisting of clay, kaolin, bentonite and conventional ceramic glaze composition. By applying the above-mentioned semi-conducting glaze composition on a prepared insulator body, the surface electrical stress distributions of a heavy duty suspension and a solid core insulators, which require the firing under a reducing atmosphere, can be improved.

4 Claims, 5 Drawing Figures

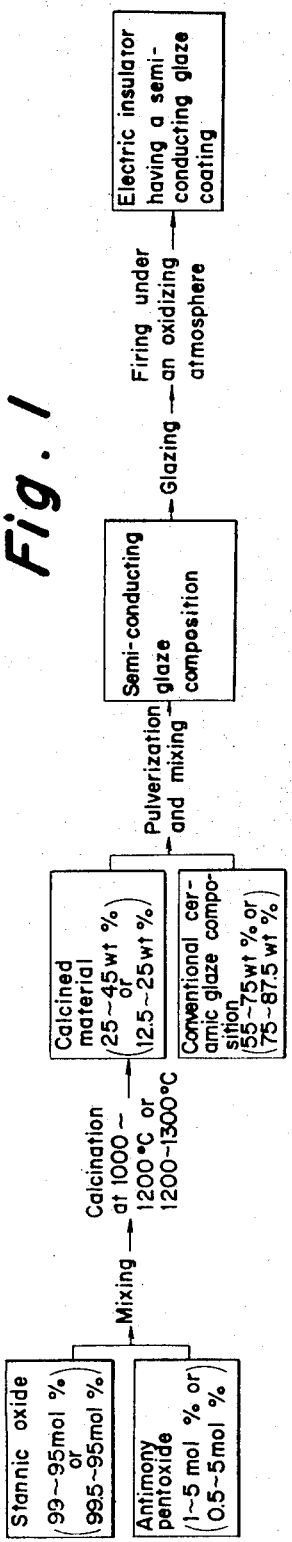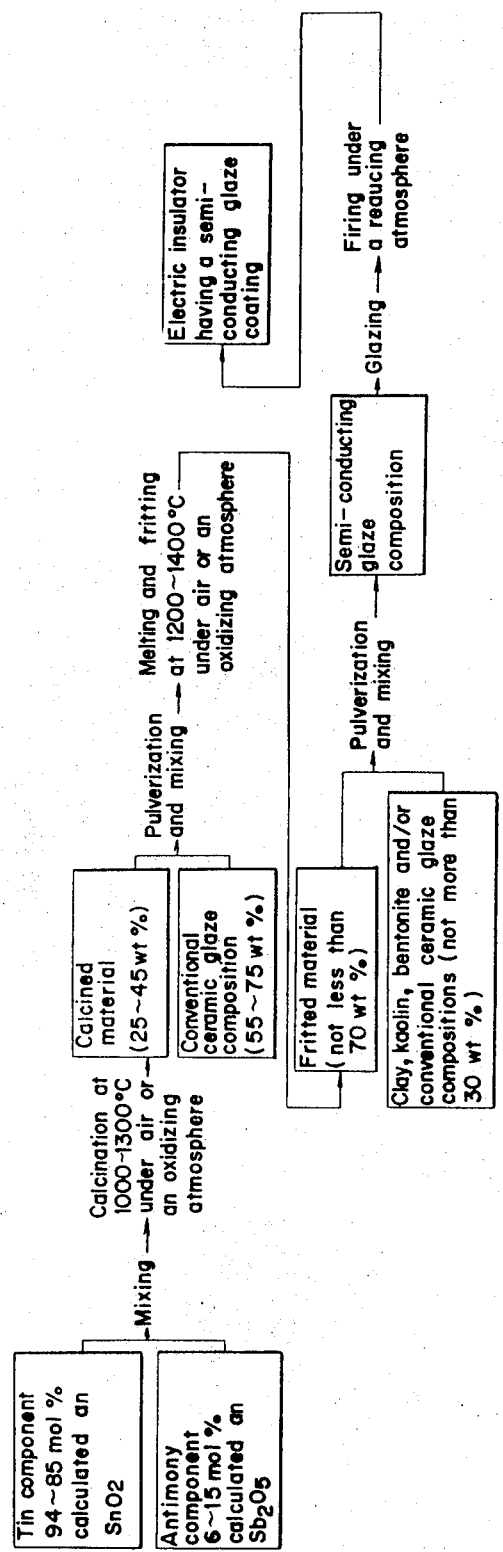
Fig. 1
(A) Conventional method
(B) The method of the present invention

METHOD FOR PRODUCING SEMI-CONDUCTING GLAZE COMPOSITIONS FOR ELECTRIC INSULATORS

The present invention relates to an electric insulator having an improved surface electrical stress distribution. More particularly, the present invention relates to a semi-conducting glaze composition capable of firing under a reducing atmosphere, an electric insulator having a semi-conducting glaze coating, and methods for producing the same.

It is necessary for porcelain for electric insulators to have no moisture absorption in order to maintain its dielectric strength at the best condition, and to obtain uniformly reproducible results and high mechanical strength. It has been known that these properties required by an electric insulator are influenced highly by the firing atmosphere. Generally, in firing under an oxidizing atmosphere, temperature distribution in the firing furnace is non-uniform and it is impossible to fire porcelains having a large wall thickness and further the firing temperature range for producing satisfactory products is much more narrow than the temperature range under a reducing atmosphere, and a bloating phenomenon occurs frequently in the resulting porcelain. On the contrary, the firing under a reducing atmosphere has such merit that the sintering of porcelain is promoted, and electric insulators having a large wall thickness, such as a heavy duty suspension insulator, and a solid core insulator having a maximum core diameter of more than 80 mm can be completely sintered to the central portion. Moreover, the temperature distribution in the furnace is uniform, and electric insulators having a stability and a high dielectric strength can be always obtained. Furthermore, it has been known that the mechanical strength of porcelain generally increases in proportion to the amount of crystals formed in the porcelain, and in the production of porcelains having a high mechanical strength, in which crystals are formed during the firing process of porcelain and the amount of the crystals is increased, it is indispensable to effect the firing under a reducing atmosphere. Further, it has been known that when an insulator body using Toseki (Pottery Stones, available in Japan), which is a main raw material for porcelain for electric insulators, is fired, porcelains having no moisture absorption cannot be obtained unless the firing is effected under a reducing atmosphere.

Based on the above-described reasons, it is very effective to effect the firing of the porcelain for electric insulators under a reducing atmosphere, and the essential points in the firing under a reducing atmosphere usually effected are as follows. A porcelain is fired under air atmosphere from room temperature to a temperature of 900° – 1,000° C and fired under a reducing atmosphere of 1 – 10 percent CO gas concentration from a temperature of 900° – 1,000° C to a maturing temperature of 1,200° – 1,380° C and then cooled under air atmosphere. Of course, the CO gas concentration at the maturing temperature is lowest, and as the temperature is lower, the CO gas concentration is higher.

The surface resistivity of a semi-conducting glaze coating applied on a high voltage insulator should be in the range of 1 – 100 MΩ/sq. For the production of a semi-conducting glaze coating having such a surface resistivity, it has been attempted to add various conducting metal oxides to a conventional ceramic glaze composition.
That is, 1. Semi-conducting glaze composition containing ferric oxide as the conducting metal oxide:

This glaze composition can be applied on an electric insulator body having a large wall thickness, which requires the firing under a reducing atmosphere, but it has been known that when the electric insulator applied with this glaze composition is used in a heavily polluted atmosphere, the insulator is liable to be subjected to an electrolytic corrosion. The temperature-coefficient of resistivity is highly negative, which gives susceptibility to thermal instability, and consequently an electric insulator having the semi-conducting glaze over substantially its entire surface fails due to the thermal instability. The appearance of this glaze is unfavorably black.

2. Semi-conducting glaze composition containing titanium oxide as the conducting metal oxide:

When this glaze composition is applied on a prepared insulator body and fired under a reducing atmosphere, the titanium oxide is reduced and the surface resistivity of the resulting semi-conducting glaze coating is less than 100 MΩ/sq. However, titanium oxide glazes are damaged by discharges, resulting in loss of conductivity due to reoxidation of the titania. Furthermore, the preparation condition, particularly the firing condition must be controlled strictly, and the glazing process of this semi-conducting glaze composition is complicated, and the commercial production is fairly restricted. Consequently, this glaze composition cannot be used commonly.

3. Semi-conducting glaze composition containing stannic oxide $SnO_2$) and antimony pentoxide ($Sb_2O_5$) as the conducting metal oxide:

When this glaze composition is applied on a prepared insulator body, the semi-conducting glaze coating has a high resistance against electrolytic corrosion, a low negative temperature-coefficient of resistivity and an adequate coefficient of thermal expansion, and the coating surface is grey or white. Therefore, this glaze composition is particularly suitable for the production of high voltage insulators, which require a high mechanical strength. Examples of these semi-conducting glaze compositions are disclosed in British Pat. Nos. 982,600; 1,098,958 (corresponding to U.S. Pat. No. 3,368,026) and 1,112,765. In all the above patents, a blue tin oxide, which is obtained by calcining a mixture of 99 – 95 mol percent of $SnO_2$ and 1 – 5 mol percent of $Sb_2O_5$ at a temperature of 1,000° – 1,200° C or by calcining a mixture of 99.5 – 95 mol percent of $SnO_2$ and 0.5 – 5 mol percent of $Sb_2O_5$ at a temperature of 1,200° – 1,300° C, is mixed with a conventional ceramic glaze composition, and the resulting mixture is applied on the surface of a ceramic article and fired to obtain a semi-conducting glaze coating on the surface of the ceramic article. However, these methods are applicable to a firing of electric insulators under an oxidizing atmosphere, but are not applicable to electric insulators having a large wall thickness which require firing under a reducing atmosphere, because the surface resistivity of the resulting semi-conducting glaze coating is more than 100 MΩ/sq., and the surface is blistered considerably.

According to the present invention, when a calcined material composed of tin oxide and antimony oxide and a conventional ceramic glaze composition are pulverized and mixed and the mixture is melted to prepare a fritted material, and the fritted material and a conventional ceramic glaze composition are again pulverized and mixed, particles, in which the electrically conductive oxides are coated with frit having conventional ceramic glaze composition, can be obtained. Accordingly, even if a prepared insulator body glazed with the semi-conducting glaze composition is fired under a reducing atmosphere, in each of the particles the firing atmosphere is shut out by the covered frit layer and the electrically conductive oxide in the center portion of each particle is not influenced by the reducing atmosphere, and a semi-conducting glaze coating, in which the appearance and the electrical conductivity are not deteriorated, can be formed.

Moreover, this semi-conducting glaze composition is easily applicable to an electric insulator having a large wall thickness, which requires the firing under a reducing atmosphere and has hitherto been impossible by the conventional method, and even in the electric insulators having a large wall thickness, the electric properties can be remarkably improved.

The details and objects as well as the characteristic features of the present invention will become more apparent and more readily understandable by the following description and the appended claims when read in conjunction with the accompanying drawings.

For a better understanding of the invention, reference is taken to the accompanying drawings, wherein:

FIGS. 1, A and B are flow sheets showing comparison of a conventional method for producing an electric insulator by using a conventional semi-conducting glaze composition with the method of the present invention by using the semi-conducting glaze composition of the present invention;

Figure 4:
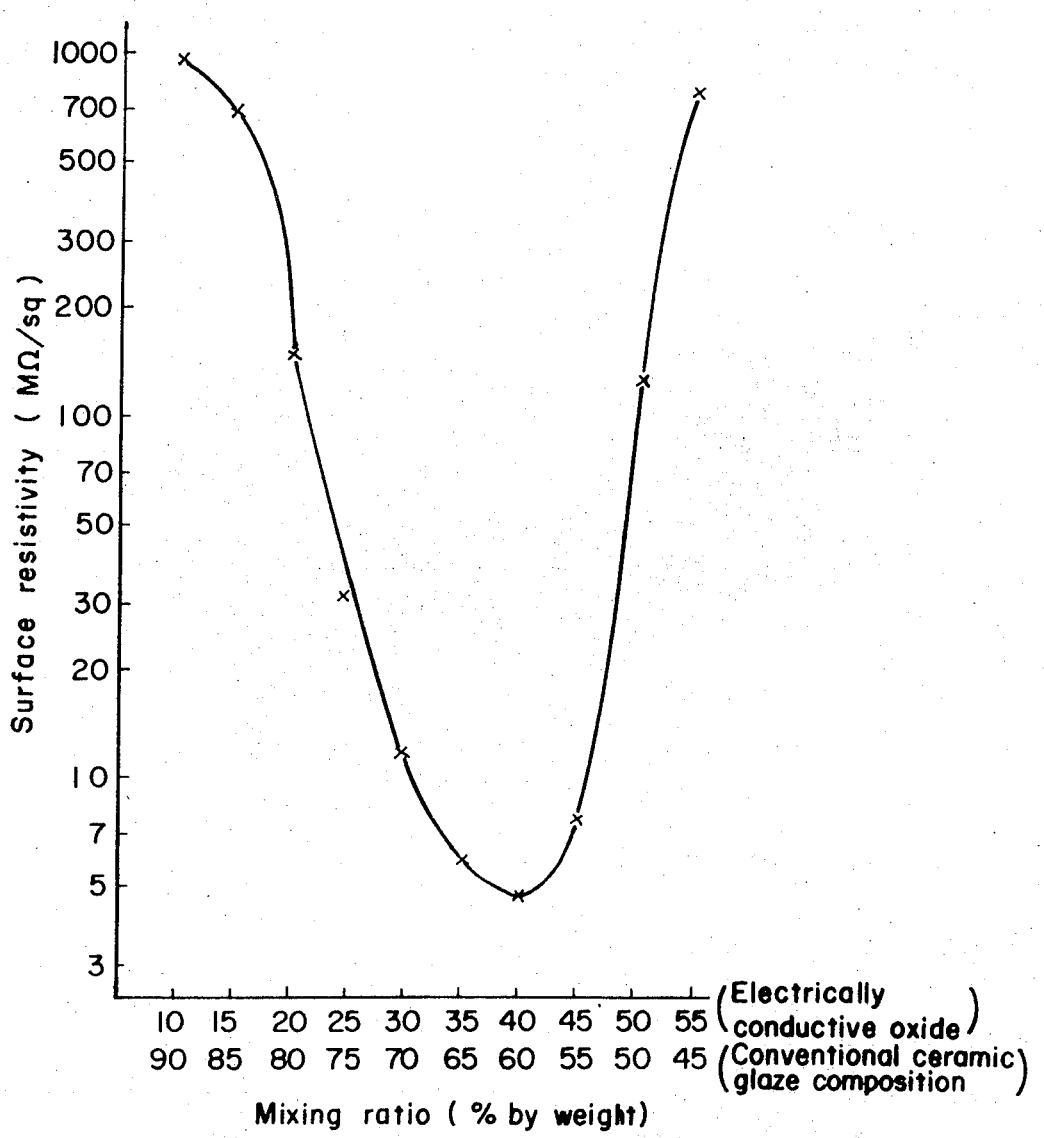
Figure 5:
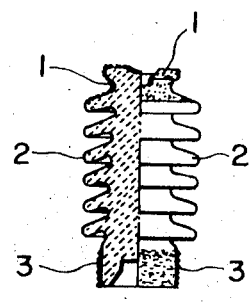

FIG. 4 is a graph showing a relation between the mixing ratio of the electrically conductive oxide to the conventional ceramic glaze composition in the fritting process in the production of semi-conducting glaze composition and the properties of the coating of the semi-conducting glaze after applied on an electric insulator body and fired under a reducing atmosphere; and FIG. 5 is a front view, partly in section, of a solid core line post insulator provided with a semi-conducting glaze coating according to the present invention.

The present invention will be explained hereinafter with reference to one preferred embodiment.

FIG. 1A shows a conventional method and FIG. 1B shows a method of the present invention. Referring to FIG. 1B, at least one of tin oxides, such as stannic oxide ($SnO_2$) and metastannic acid ($H_2SnO_3$) in an amount of 85 – 94 mol percent calculated as $SnO_2$ is mixed with at least one of antimony oxides, such as metallic antimony (Sb), antimony trioxide ($Sb_2O_3$) and antimony pentoxide ($Sb_2O_5$), in an amount of 6 – 15 mol percent calculated as $Sb_2O_5$, and the resulting mixture is calcined at a temperature of 1,000° – 1,300° C under air or an oxidizing atmosphere (hereinafter, this process is referred to as calcination process) and then pulverized. 25 – 45 percent by weight of the resulting powders is mixed with 55 – 75 percent by weight of conventional ceramic glaze composition for insulators consisting of commonly used glaze materials, such as feldspar, dolomite, talc, calcite, kaolin, clay and quartz sand, and the resulting mixture is melted at a temperature of 1,200° – 1,400° C under air or an oxidizing atmosphere to prepare a fritted material (hereinafter, this process is referred to as a fritting process). Not less than 70 percent by weight of this fritted material and not more than 30 percent by weight of at least one of clay, kaolin, bentonite or conventional glaze compositions are pulverized and mixed by means of a trommel to prepare a semi-conducting glaze slip. This slip is a semi-conducting glaze composition suitable for applying on an insulator body having a large wall thickness, which requires the firing under a reducing atmosphere. When this slip is applied on the surface of a prepared insulator body by a conventional process, for example, a spraying process or a dipping process, and the glazed insulator body is subjected to a conventional firing under a reducing atmosphere which is commonly used for firing porcelains for electric insulator, a semi-conducting glaze coating having a surface resistivity of 1 – 100 MΩ/sq. and a grey or white color is formed on the insulator body surface.

According to the calcination process, antimony component is doped into tin component to develop electrical conductivity. When the calcination temperature is lower than 1,000° C under air or an oxidizing atmosphere, the antimony component cannot be completely doped into the tin component, and when the glaze containing these calcined material is applied on a prepared insulator body, the properties of the semi-conducting glaze coating are instable. While, when the calcination temperature is higher than 1,300° C, the antimony component volatilizes rapidly, and the desired tin component doped with antimony component cannot be obtained, and consequently when the glaze containing these calcined materials is applied on a prepared insulator body, the surface resistivity of the semi-conducting glaze coating is higher than 100 MΩ/sq. Therefore, it is necessary that the calcination process should be effected at a temperature of 1,000° – 1,300° C under an oxidizing atmosphere. Furthermore, if the calcination process is effected under a reducing atmosphere, for instance, in the presence of gaseous CO or gaseous $H_2$, the tin component is reduced at a temperature higher than about 1,000° C to form metallic tin, which volatilizes, so that the desired tin component doped with antimony component cannot be obtained. While, if the temperature is less than 1,000° C, the antimony component cannot be completely doped into tin component, and the desired semi-conducting glaze composition cannot be obtained. Therefore, the calcination process should be effected under an oxidizing atmosphere.

In the fritting process, the electrically conductive oxides are coated with frit having conventional ceramic glaze composition, and this fritting process is the essential feature of the present invention. By this fritting process, the electrically conductive oxides are coated with the above-described frit to form a fritted material. Accordingly, even when a semi-conducting glaze composition prepared from this fritted material is fired under a reducing atmosphere which is indispensable for an electric insulator having a large wall thickness, these oxides are not reduced and the semi-conducting glaze composition can develop completely its excellent property.

When a semi-conducting glaze composition is prepared from not less than 70 percent by weight of the fritted material and not more than 30 percent by weight of at least one of clay, kaolin, bentonite or conventional ceramic glaze compositions, the resulting semi-conducting glaze composition is easier to control as to viscosity and is more improved in workability than the glaze composition prepared from the fritted material alone. Moreover, the semi-conducting glaze coating is excellent in the surface condition, that is, there are very few pinholes. These phenomena are more remarkable, as the amount of the above clay, kaolin, bentonite or conventional ceramic glaze compositions increases. However, when the said amount is more than 30 percent by weight, the surface resistivity of the resulting semi-conducting glaze coating increases rapidly and exceeds 100 MΩ/sq. While, the semi-conducting glaze composition prepared from the fritted material alone lowers somewhat in workability, but can be used. Accordingly, the amount of at least one of clay, kaolin, bentonite or other conventional ceramic glaze compositions is preferably not more than 30 percent by weight.

The following examples are given in illustration of this invention and are not intended as limitations thereof.

EXAMPLE 1

$SnO_2$ and $Sb_2O_5$ were mixed in a ratio as shown in the following Table 1 and the resulting mixture was calcined at 1,200° C for 2 hours in air in an electric furnace. The calcined material was pulverized to a particle size of 325 mesh under. 30 percent by weight of the resulting powder and 70 percent by weight of a conventional ceramic glaze composition were mixed and melted at 1,300° C in air to prepare a fritted material. 97 percent by weight of the resulting fritted material and 3 percent by weight of kaolin were mixed and pulverized to a particle size of 325 mesh under by means of a trommel to obtain a semi-conducting glaze slip. The slip was applied on a prepared insulator body, and the glazed insulator body was subjected to a firing under a reducing atmosphere at a maturing temperature of 1,260° C and a maximum CO gas concentration of 6.1 percent to obtain a fired insulator body, which had a surface condition and a surface resistivity as shown in FIG. 2.

Figure 2:
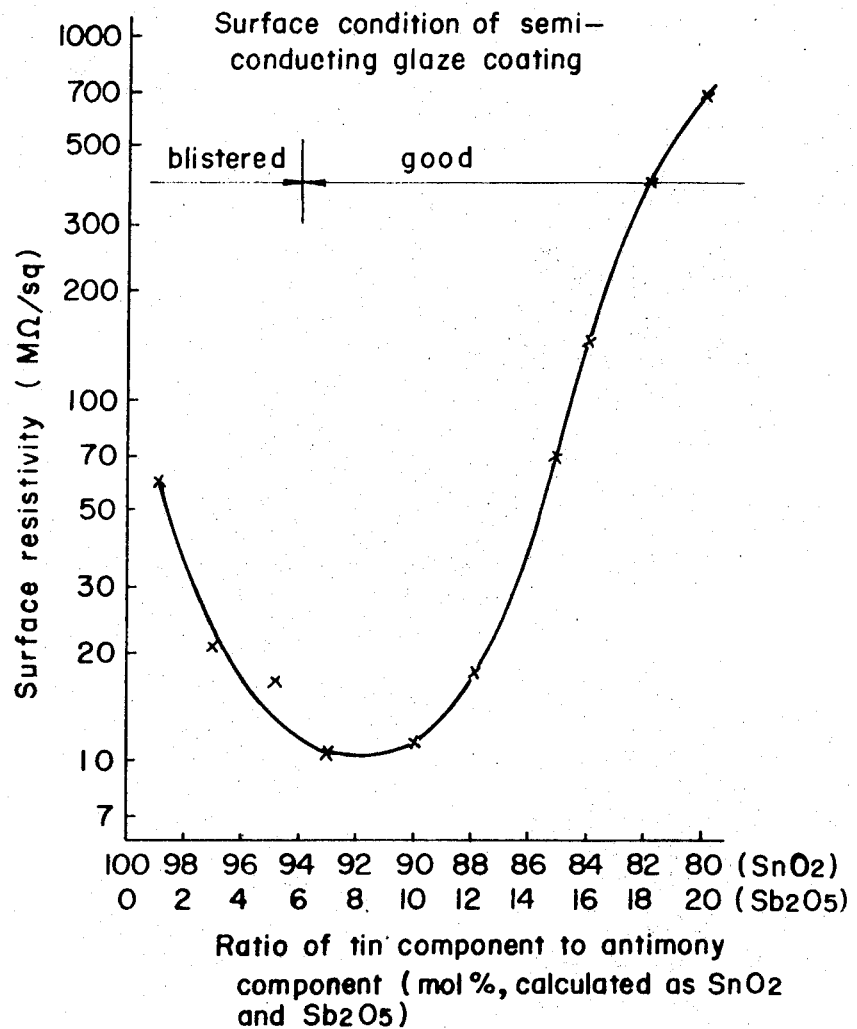
FIG. 2 is a graph showing a relation between the ratio of tin component to antimony component in the production of the semi-conducting glaze composition of the present invention and the properties of the coating of the semi-conducting glaze after applied on an electric insulator body and fired under a reducing atmosphere.

As seen from FIG. 2, when the ratio of $Sb_2O_5$ is less than 6 mol percent, blisters are formed on the surface of the semi-conducting glaze coating, and when the ratio is more than 15 mol percent, the surface resistivity of the semi-conducting glaze coating is higher than 100 MΩ/sq., and consequently the aimed properties cannot be obtained.

Therefore, it has been found that is is preferable to use a tin component in an amount of 85 – 94 mol percent calculated as $SnO_2$ and to use an antimony component in an amount of 6 – 15 mol percent calculated as $Sb_2O_5$. More particularly, in the case of a tin component of 88 – 92 mol percent (as $SnO_2$) and an antimony component of 8 – 12 mol percent (as $Sb_2O_5$), the surface of the semi-conducting glaze coating is good and the surface resistivity is stable.

TABLE 1

| | Mol% | | | | | | | | | |
|---|---|---|---|---|---|---|---|---|---|---|
| $SnO_2$ | 99 | 97 | 95 | 93 | 90 | 88 | 85 | 84 | 82 | 80 |
| $Sb_2O_5$ | 1 | 3 | 5 | 7 | 10 | 12 | 15 | 16 | 18 | 20 |

EXAMPLE 2

A mixture of 92 mol percent of $SnO_2$ and 8 mol percent of $Sb_2O_5$ was calcined at 1,100° C for 2 hours in air in an electric furnace, and the calcined material was pulverized to a particle size of 325 mesh under. 35 percent by weight of the resulting powder was mixed with 65 percent by weight of a conventional ceramic glaze composition, and the resulting mixture was subjected to the following the fritting processes.

In one of the processes, the mixtures were melted at 1,000°, 1,100°, 1,200°, 1,300°, 1,400° and 1,500° C for 2 hours in air in an electric furnace, respectively. In another process, the mixtures were melted at 1,100°, 1,200°, 1,300° and 1,400° C for 2 hours under a reducing atmosphere of 3 percent CO gas concentration, respectively.

95 percent by weight of each of the resulting fritted materials and 5 percent by weight of a conventional glaze composition were mixed and pulverized by means of a trommel to obtain 10 semi-conducting glaze slips. Each of the resulting slips was applied on a prepared insulator body and the glazed insulator body was subjected to a conventional firing under a reducing atmosphere at a maturing temperature of 1,280° C and a maximum CO gas concentration of 6.4 percent to obtain a fired insulator body. The surface resistivities of the fired insulator bodies are shown in FIG. 3.

Figure 3:
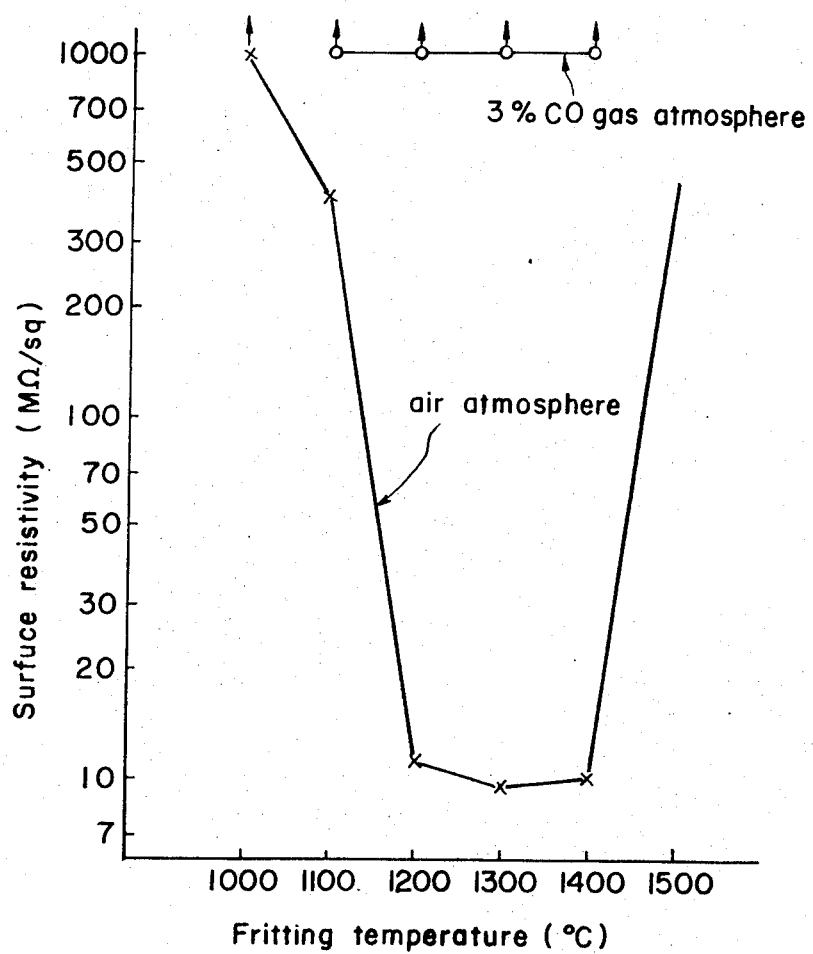
FIG. 3 is a graph showing a relation between the firing condition in the fritting process and the properties of the coating of semi-conducting glaze after applied on an electric insulator body and fired under a reducing atmosphere.

As seen from FIG. 3, when the firing temperature in the fritting process under air atmosphere is lower than 1,200° C or higher than 1,400° C, the surface resistivity is higher than 100 MΩ/sq., and consequently such firing temperature ranges are not preferable. Further, it has been found that when the firing in the fritting process is effected under a reducing atmosphere, the surface resistivity is always higher than 1,000 MΩ/sq., and consequently the firing under a reducing atmosphere is not preferable.

EXAMPLE 3

A mixture consisting of 90 mol percent of $SnO_2$ and 10 mol percent of $Sb_2O_5$ was used as an electrically conductive oxide and calcined at 1,200° C for 2 hours in air in an electric furnace, and the resulting calcined material was pulverized to a particle size of 325 mesh under. The resulting powder was mixed with a conventional ceramic glaze composition in a weight ratio as shown in the following Table 2, and the resulting mixtures were subjected to a fritting process, wherein the mixtures were melted at 1,400° C for 2 hours in air in an electric furnace, to obtain fritted materials. Each of the fritted materials was pulverized to a particle size of 325 mesh under by means of a trommel to obtain a semiconducting glaze slip.

Each of the semi-conducting glaze slips was applied on a prepared insulator body, and the glazed insulator bodies were subjected to a conventional firing under a reducing atmosphere at a maturing temperature of 1,280° C and a maximum CO gas concentration of 6.4 percent to obtain fired insulator bodies. The surface resistivities of the fired insulator bodies are shown in FIG. 4.

As seen from FIG. 4, unless the electrically conductive oxide and the conventional ceramic glaze composition are used in amounts of 25 – 45 percent by weight and 55 – 75 percent by weight respectively, the surface resistivity is higher than 100 MΩ/sq., and therefore the semi-conducting glaze composition beyond this range is not preferable.

TABLE 2

| | % by weight | | | | | | | | | |
|---|---|---|---|---|---|---|---|---|---|---|
| Electrically conductive oxide | 10 | 15 | 20 | 25 | 30 | 35 | 40 | 45 | 50 | 55 |
| Conventional ceramic glaze composition | 90 | 85 | 80 | 75 | 70 | 65 | 60 | 55 | 50 | 45 |

EXAMPLE 4

A mixture of 90 mol percent of $SnO_2$ and 10 mol percent of $Sb_2O_5$ was calcined at 1,200° C for 2 hours in air in the electric furnace, and the calcined material was pulverized to a particle size of 325 mesh under. 35 percent by weight of the resulting powder was mixed with 65 percent by weight of a conventional ceramic glaze having a molar composition of 0.40 of KNaO, 0.30 of CaO, 0.30 of MgO, 0.75 of $Al_2O_3$ and 6.00 of $SiO_2$, and the resulting mixture was fired at 1,250° C for 2 hours in air in an electric furnace to obtain a fritted material, which was then pulverized to a particle size of 325 mesh under. 90 percent by weight of the pulverized fritted material and 10 percent by weight of the above-mentioned ceramic glaze composition were mixed by means of a trommel by adding water in such an amount that the water content was 42 percent by weight to prepare a semi-conducting glaze slip. The glaze slip was applied on the top portion 1 of insulating part of a 34.5 KV line post insulator body as shown in FIG. 5, the maximum core diameter after the firing being 80 mm, in a thickness of the glaze layer of 0.30 – 0.33 mm, the other portion 2 of the insulator body was glazed with a conventional light-grey non-conducting glaze, and then the external periphery 3 of the lower end was sanded. The above treated insulator body was fired under a conventional reducing atmosphere at a maturing temperature of 1,260° C and a maximum CO gas concentration of 6.6 percent.

The surface resistivity of the semi-conducting glaze coating after the firing was within a range of 11.0 – 14.8 MΩ/sq., and the surface had a good condition and a light-grey color.

Then, a base metal fitting was cemented to the external periphery 3 and the corona starting voltage test was made and the voltage observed was about 45 KV.

EXAMPLE 5

Semi-conducting glaze slips as shown in the following Table 3 were prepared and these slips were applied on the entire surface of prepared suspension insulator bodies for extra high voltage overhead transmission lines having a diameter of 320 mm in a thickness of the glaze layer of 0.27 – 0.32 mm, and the glazed insulator bodies were fired under a conventional reducing atmosphere at a maturing temperature of 1,290° C and a maximum CO gas concentration of 5.8 percent. After completion of the firing, cap and pin were cemented to the fired insulator body, and the surface resistivity, surface condition and withstand voltage test under polluted condition was made. The obtained result is also shown in Table 3. The test is effected in the following way, that is, a constant voltage is applied to the specimen which has been dried after polluted to degree of pollution in terms of salt deposit density of 0.21 $mg/cm^2$, and then artificial fog is produced and the maximum voltage that the specimen will endure without flashover or failure due to thermal instability is examined.

As seen from Table 3, the suspension insulator body fired according to the present invention is more than 30% higher in the pollution withstand voltage per unit than the conventional suspension insulator body coated with the semi-conducting glaze containing ferric oxide, to which the firing under a reducing atmosphere has previously been applicable.

TABLE 3

| Preparation condition of semi-conducting glaze | | Present invention | | | | Conventional method |
|---|---|---|---|---|---|---|
| | | (a) | (b) | (c) | (d) | |
| Combination of electrically conductive oxides | SnO₂ | (¹) | (¹) | (¹) | | Ferric oxide, titanium dioxide and chromic oxide. |
| | H₂SnO₃ | | | (¹) | (¹) | |
| | Sb | | (¹) | | (¹) | |
| | Sb₂O₃ | | | (¹) | (¹) | |
| | Sb₂O₅ | (¹) | | | | |
| Mixing ratio of electrically conductive oxides (mol %, calculated value). | SnO₂ | 88 | 88 | 88 | 88 | Fe₂O₃: 60. TiO₂: 25. Cr₂O₃: 15. |
| | Sb₂O₅ | 12 | 12 | 12 | 12 | |
| Calcination condition (in air, in an electric furnace) | Temperature (°C.) | 1,150 | 1,150 | 1,150 | 1,150 | Not calcined. |
| | Time (hour) | 2 | 2 | 2 | 2 | |
| Particle size of pulverized calcined material (mesh) | | −325 | −325 | −325 | −325 | |
| Ceramic glaze composition for the preparation of fritted material (molar composition). | KNaO | 0.30 | 0.30 | 0.35 | 0.35 | |
| | CaO | 0.50 | 0.50 | 0.45 | 0.45 | |
| | MgO | 0.20 | 0.20 | 0.20 | 0.20 | |
| | Al₂O₃ | 0.60 | 0.60 | 0.65 | 0.65 | |
| | SiO₂ | 5.00 | 5.00 | 5.00 | 5.00 | |
| Mixing ratio of calcined material to ceramic glaze composition in the production of fritted material (percent by weight). | Calcined material | 35 | 35 | 35 | 35 | |
| | Ceramic glaze composition. | 65 | 65 | 56 | 65 | |
| Firing condition in fritting process (in air, in an electric furnace). | Temperature (°C.) | 1,350 | 1,350 | 1,350 | 1,350 | |
| | Time (hour) | 2 | 2 | 2 | 2 | |
| Particle size of pulverized fritting material (mesh) | | −325 | −325 | −325 | −325 | Electrically conductive oxide: 25% ceramic glaze composition. KNaO : 0.30, CaO : 0.20, MgO : 0.50, Al₂O₃ : 0.65, SiO₂ : 5.00 }75%. |
| Compounding recipe in the production of semiconducting glaze slip (percent by weight). | Fritted material | 100 | 80 | 80 | 95 | |
| | Kaolin | 0 | 0 | 20 | 0 | |
| | Clay | 0 | 20 | 0 | 0 | |
| | Bentonite | 0 | 0 | 0 | 5 | |
| Properties suspension insulator: | | | | | | |
| Surface resistivity (MΩ/sq.) | | 5–12 | 32–42 | 28–40 | 15–26 | 18–39. |
| Surface condition | Colour | Grey | (²) | (²) | Grey | Black. |
| | Condition | Good | Good | Good | Good | Good. |
| Withstand voltage under polluted condition per unit insulator (kv.). | | (³) | (⁴) | (⁴) | (⁵) | 12.0 (failed due to thermal instability at 12.5KV). |

¹ Indicates the oxide used. ² Light grey. ³ 16.5 (flashed over at 17.0KV). ⁴ 16.0 (flashed over at 16.5KV). ⁵ 16.5 (flashed over at 17.0KV)

The clay, kaolinite and bentonite used in the above Table 3 had chemical compositions as shown in the following Table 4.

The ceramic glaze having a molar composition of 0.2 – 0.5 of KNaO, 0.2 – 0.6 of CaO, less than 0.3 of MgO, 0.5 – 0.9 of Al₂O₃ and 4.0 – 9.0 of SiO₂ is preferably used in the present invention.

TABLE 4

Chemical compositions (% by weight) of clay, kaolinite and bentonite used in Example 5.

| | Clay | Kaolinite | Bentonite |
|---|---|---|---|
| Ignition Loss | 14.16 | 11.20 | 6.06 |
| SiO₂ | 48.76 | 50.56 | 69.85 |
| Al₂O₃ | 33.50 | 33.8 | 12.86 |
| Fe₂O₃ | 1.42 | 0.50 | 1.83 |
| CaO | 0.29 | 0.04 | 4.48 |
| MgO | 0.16 | 0.08 | 0.58 |
| K₂O | 0.70 | 2.70 | 2.01 |
| Na₂O | trace | 0.90 | 1.06 |
| Total | 99.97 | 99.88 | 98.71 |

Although in the above-mentioned Example 4, the semi-conducting glaze composition according to the invention is applied on the top portion 1 of prepared line post insulator bodies and a conventional non-conducting glaze composition is applied on the other portion 2 of the insulator bodies, according to the present invention the semi-conducting glaze composition of the present invention may be applied on the entire surfaces of line post insulator bodies and suspension insulator bodies or may be applied additionally on the conventional non-conducting glaze layer.

According to the present invention, drawbacks in the prior technics can be obviated completely, and large scale and heavy duty suspension insulators and solid core insulators having an excellent semi-conducting glaze coating can be produced. Moreover, the pollution withstand voltage of the resulting insulators is improved. Consequently, transmission lines to be used under severe pollution condition can be designed. Furthermore, the resulting insulators have beautiful grey or white appearance.

While, several examples have been herein disclosed, it is obvious that various changes can be made without departing from the spirit and scope of the invention as set forth in the appended claims. Further, it is to be understood that all matter hereinbefore set forth is to be interpreted as illustrative and not in a limiting sense.

What is claimed is:

1. A method of producing electric insulators having a semi-conducting glaze coating, which consists in calcining an electrically conductive oxide of a mixture of 85 – 95 mol percent, calculated as SnO₂, of at least one tin oxide selected from the group consisting of SnO₂ and H₂SnO₃ and 6 – 15 mol percent, calculated as Sb₂O₅, of at least one antimony oxide selected from the group consisting of Sb, Sb₂O₃ and Sb₂O₅ at a temperature of 1,000° – 1,300° C under an oxidizing atmosphere, pulverizing the calcined mixture; mixing 25 – 45 percent by weight of the pulverized mixture with 55 – 75 percent by weight of a conventional ceramic glaze composition; melting the resulting mixture at a temperature of 1,200° – 1,400° C under an oxidizing atmosphere; pulverizing the melt to obtain a fritted material; mixing not less than 70 percent by weight of the resulting fritted material with not more than 30 percent by weight of at least one member selected from the group consisting of clay, kaolin, bentonite and conventional ceramic glaze compositions; applying the resulting mixture on a prepared insulator body; and firing the glazed insulator body under a conventional reducing atmosphere.

2. The method as claimed in claim 1, wherein said electrically conductive oxide is composed of 88 – 92 mol percent, calculated as SnO₂, of at least one tin oxide selected from the group consisting of SnO₂ and H₂SnO₃ and 8 – 12 mol percent, calculated as Sb₂O₅, of at least one antimony oxide selected from the group consisting of Sb, Sb₂O₃ and Sb₂O₅.

3. The method as claimed in claim 2, wherein said tin oxide is SnO₂ and said antimony oxide is Sb₂O₅.

4. The method as claimed in claim 1, wherein said tin oxide is SnO₂ and said antimony oxide is Sb₂O₅.

* * * * *

UNITED STATES PATENT OFFICE
CERTIFICATE OF CORRECTION

Patent No. 3,658,583                    Dated April 25, 1972

Inventor(s) YUTAKA OGAWA, ET AL.

It is certified that error appears in the above-identified patent and that said Letters Patent are hereby corrected as shown below:

In column 2, line 16, amend "oxide $SnO_2$)" to -- oxide ($SnO_2$) --;

In column 7, Table 3, the last line, amend "isulator" to -- insulator --;

In Claim 1, line 3, amend "85-95 mol percent" to -- 85-94 mol percent --;

Signed and sealed this 9th day of January 1973.

(SEAL)
Attest:

EDWARD M. FLETCHER, JR.　　　　　　　　ROBERT GOTTSCHALK
Attesting Officer　　　　　　　　　　　　Commissioner of Patents